United States Patent [19]

Wada

[11] 4,025,835

[45] May 24, 1977

[54] THREE-PHASE BRUSHLESS DC MOTOR

[75] Inventor: Kinzo Wada, Yokohama, Japan

[73] Assignee: Victor Company of Japan, Limited, Japan

[22] Filed: Sept. 5, 1975

[21] Appl. No.: 610,876

[30] Foreign Application Priority Data

Sept. 7, 1974 Japan .............................. 49-102526

[52] U.S. Cl. .............................. 318/254; 318/138; 318/439
[51] Int. Cl.$^2$ ........................................ H02K 23/04
[58] Field of Search ................... 318/138, 254, 439

[56] References Cited

UNITED STATES PATENTS

| | | | |
|---|---|---|---|
| 3,440,506 | 4/1969 | Krestel et al. ................. | 318/254 X |
| 3,517,289 | 6/1970 | Brunner et al. ................ | 318/254 X |
| 3,651,368 | 3/1972 | Hanada ............................ | 318/254 |
| 3,757,185 | 8/1973 | Brunner et al. .................. | 318/254 |
| 3,930,190 | 12/1975 | Liska .................................. | 318/254 |

Primary Examiner—Gene Z. Rubinson
Attorney, Agent, or Firm—Robert E. Burns; Emmanuel J. Lobato; Bruce L. Adams

[57] ABSTRACT

A three-phase brushless DC motor has three power transistors with their collector-emitter paths connected to the respective stator windings, and two Hall effect devices each having a pair of control current electrodes and a pair of Hall voltage electrodes. One of the Hall voltage electrodes of the Hall effect devices is connected to the base electrodes of the first and second power transistors and the other Hall voltage electrodes are connected together by a combining network which delivers a resultant voltage to the base electrode of the third power transistor. A voltage dividing and balancing network is connected between the base electrodes of the first and second transistors and between the control current electrodes of the Hall effect devices to drive the stator windings with three-phase commutating currents of equal amplitude.

10 Claims, 4 Drawing Figures

THREE-PHASE BRUSHLESS DC MOTOR

BACKGROUND OF THE INVENTION

The present invention relates generally to a brushless DC motor. More particularly the invention relates to a three-phase brushless DC motor having a permanent magnet rotor and Hall effect devices for stator current commutation.

In a prior art three-phase brushless DC motor, Hall effect devices are employed each being associated with each of the three stator windings to effect commutation of the winding currents. However, the operating characteristics of the Hall effect devices, particularly the DC potential at their Hall voltage electrodes, differ from one device to another. The non-uniform characteristics would result in differing winding currents and commutation intervals. Thus, the greater the number of Hall effect devices employed, the more it becomes difficult to provide uniform commutation currents and intervals.

SUMMARY OF THE INVENTION

The primary object of the present invention is therefore to provide an improved three-phase brushless DC motor in which communication is effected by two Hall effect devices.

The Hall effect device is provided with a pair of control current electrodes and a pair of Hall voltage electrodes. Three-phase brushless DC motor of the invention employs two Hall effect devices electrically displaced by 120° from each other and three power transistors, and is powered by a DC voltage. The three stator windings have their one ends connected in common to a positive terminal of a DC voltage source and the other ends connected to a negative terminal of the DC voltage source via the collector-emitter path of the respective power transistors. The base electrodes of a first and a second power transistor are connected to one of the Hall voltage electrodes via a voltage dividing and balancing network. The base electrode of the third transistor is connected to the other Hall voltage electrodes of the Hall effect devices via a combining resistor network.

The voltage dividing and balancing network comprises a plurality of resistors interconnected in a crosswise bridge configuration. One circuit bridge of the network is connected between the base electrodes of the first and second transistors and forms a loop through the Hall voltage electrodes of the two Hall effect devices to divide out the sinusoidal Hall voltages, the other circuit bridge being connected across the control current electrodes to maintain the DC potential at the Hall voltage electrodes at an equal potential.

The combining resistor network includes a pair of series-connected resistors of equal resistance, the interconnection between the two resistors being coupled to the base electrode of the third power transistor.

The values of these resistors of the two networks are chosen such that the crosspoint of the network is maintained at a potential equal to one-half the voltage across the control current electrodes of the Hall devices and such that sinusoidal Hall voltages of equal amplitude are delivered to the base electrode of the respective power transistors.

The sinusoidal Hall voltages delivered by the Hall effect devices are out of phase by 120° from each other. Thus, switching occurs in the first and second transistors upon the occurrence of the Hall voltages at 120° out of phase. The base electrode of the third transistor receives a signal which is a vector sum of the sinusoidal Hall voltages having an inverse phase relation to those applied to the first and second transistors, so that switching occurs in the third transistor just 120° out of phase from the first and second transistors.

BRIEF DESCRIPTION OF THE DRAWINGS

These and other objects, features of the invention will be apparent from the following description taken in conjunction with the accompanying drawings, in which.

DESCRIPTION OF THE PREFERRED EMBODIMENTS

Figure 1:
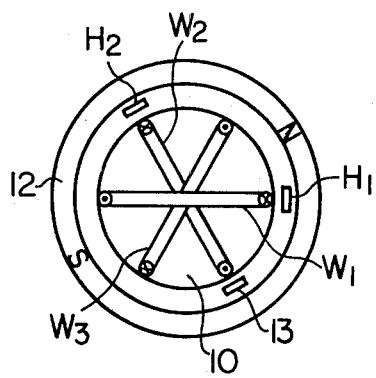
FIG. 1 is a sketch of an embodiment of the brushless DC motor of the invention, showing three stator windings and two Hall effect devices.
Figure 2:
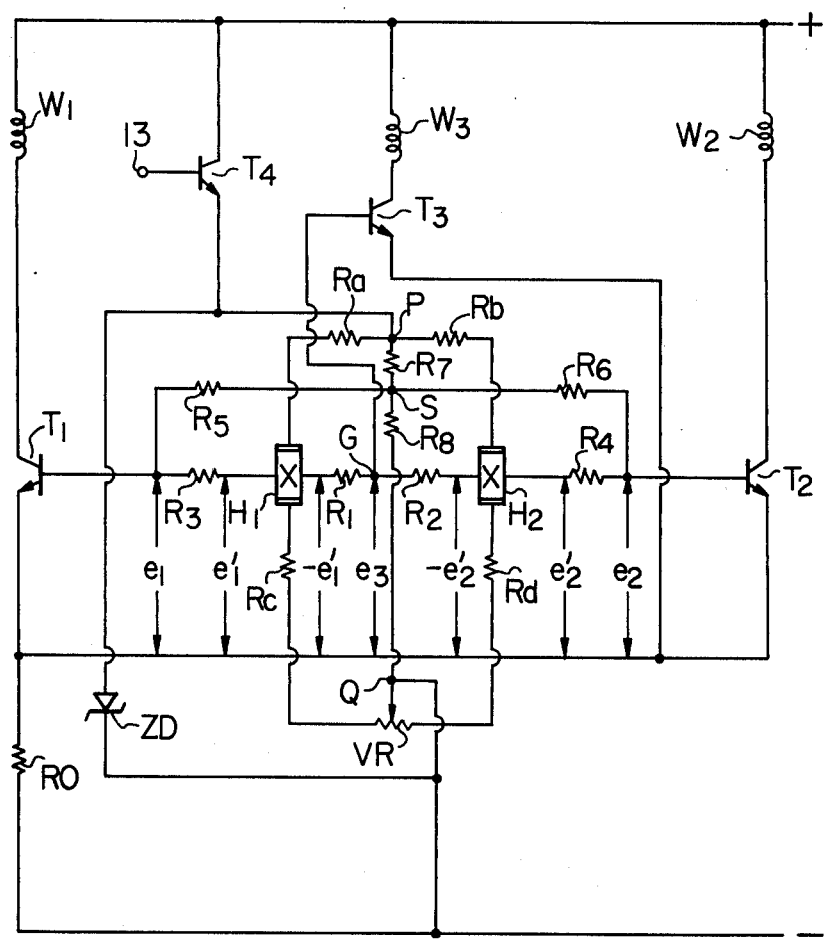
FIG. 2 shows a circuit diagram of an embodiment of the brushless DC motor of the invention.

Referring now to FIGS. 1 and 2, the stator 10 of a brushless DC motor has windings W1 to W3. The permanent magnet rotor 12 of the motor has diametrically opposed poles N and S. Two Hall effect devices H1 and H2 are arranged in proximity to corresponding stator windings W1 and W2 and electrically displaced from each other by 120°.

Figure 3:
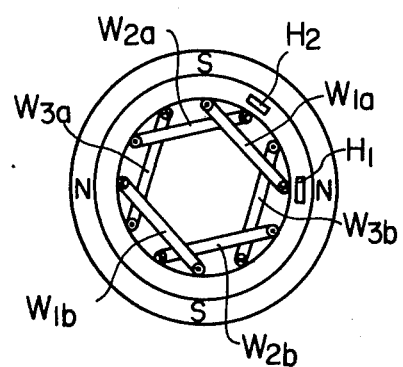
FIG. 3 is a sketch of a modified form of the embodiment of FIG. 1, showing six winding branches electrically displaced by 120° from each other.

The stator windings W1 to W3 have their one ends connected in common to the positive polarity terminal of a DC voltage source (not shown) and their other ends connected to the collector electrode of a corresponding one of power transistors T1 and T3 which may be Darlington amplifiers. It is to be noted that the Hall effect device H2 can be located as at 13 in FIG. 1 which is electrically displaced from the Hall effect device H1 by 300° (= 120° + 180°). If each of the stator windings W1 to W3 has a pair of series- or parallel-connected winding branches $a$ and $b$ as shown in FIG. 3, the rotor has two pairs of magnetic poles and the Hall effect devices H1 and H2 can be electrically displaced by 120° + 180° × $n$ (where $n$ = 0, 1, 2, 3 ... ) from each other.

The emitter electrodes of the power transistors T1 to T3 are connected in common via a resistor R0 to the negative polarity terminal of the DC voltage source.

To permit the power transistors T1 to T3 to be controlled by the Hall effect devices, the base electrodes of the power transistors T1 and T2 are connected to one of the Hall voltage electrodes of the Hall effect devices H1 and H2 via resistors R3 and R4, respectively. The other Hall voltage electrodes of the devices H1 and H2 are connected by resistors R1 and R2 of equal value. The base electrode of the transistor T3 is connected to the interconnection between the resistors R1 and R2.

The control current electrodes of the Hall effect devices H1 and H2 are connected via resistors Ra and Rb and via the collector-emitter path of a speed control transistor T4 to the positive terminal of the DC voltage source. The other control current electrodes of the Hall effect devices are connected via resistors Rc and Rd and via a variable resistor VR to the negative terminal of the voltage source. The base electrode of transistor R4 is connected to a suitable speed control source 13. The resistors Ra, Rb, Rc and Rd are for the purpose of adjusting the amount of currents that pass through the Hall effect devices H1 and H2 through the control current terminals thereof so that the devices H1 and H2 deliver an equal DC potential at their Hall voltage electrodes. If the Hall effect devices H1 and H2 have an equal operating characteristic, the resistors Ra to Rd should have an equal resistance. However, these resistors should be carefully chosen if the Hall effect devices have different operating characteristics so as to permit them to deliver an equal DC voltage at their Hall voltage terminals.

Between the base electrodes of the power transistors, R5 and R6 another resistor network including series connected resistors R7 and R8 of equal resistance is connected across a point P where resistors Ra and Rb are connected and a point Q where the tap point of the variable resistor VR is connected. The resistors R3 and R5 have equal resistances and the resistors R4 and R6 have also equal resistances. The intermediate point of the resistor network R5, R6 and the intermediate point of the resistor network R7, R8 are connected as indicated by letter S. It is to be noted that the resistors R3 to R6 should have a resistance value much greater than the resistance of R7.

With the Hall effect devices H1 and H2 so conditioned to deliver an equal DC voltage at their terminals, sinusoidal voltages $e_1'$, $-e_1'$, and $e_2'$, $-e_2'$ are delivered from the opposite voltage electrodes of the Hall effect devices H1 and H2, respectively. The voltages $e_1'$ and $e_2'$ have the same amplitude but are out of phase by 120° from each other.

Figure 4:
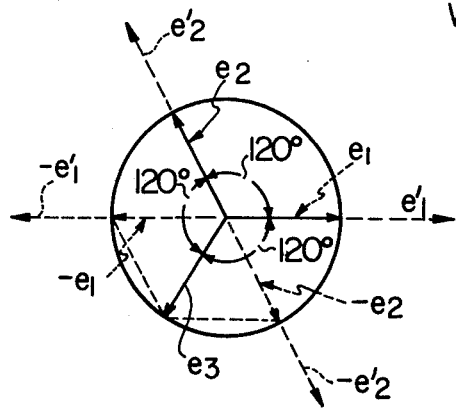
FIG. 4 is a vector diagram of voltages delivered from the Hall effect devices.

A sinusoidal voltage $e_3$ which is a vector sum of voltages $-e_1'$ and $-e_2'$ develops at a point G between the resistors R1 and R2 and is delivered to the base electrode of transistor T3 (see FIGS. 2 and 4). The voltage $e_3$ is out of phase by 120° from $e_1'$ and $e_2'$ and has an amplitude half as much as the voltage $e_1'$ or $e_2'$ because it is derived from the midpoint of the equal resistances R1 and R2.

When the DC potential at the crosspoint S is maintained at a voltage half as much as the voltage across the points P and Q, DC potentials at the Hall voltage electrodes of the devices H1 and H2 are substantially equal to the potential at point S. Under these conditions, there develops substantially no sinusoidal voltage at the point S. The variable resistor VR may be adjusted to compensate for any departure in the DC potential at the Hall voltage electrodes from the desired voltage level.

The resistor network R5, R6 not only has the function of maintaining the DC potential at point S equal to the potential across points P and Q, but also providing sinusoidal Hall voltages $e_1$ and $e_2$ of amplitude half as much as the amplitude of the sinusoidal Hall voltages $e_1'$ and $e_2'$, respectively.

It will be noted from the above that the sinusoidal Hall voltages $-e_1'$ and $-e_2'$ are combined by a combining network consisting of resistors R1 and R2, while the sinusoidal Hall voltages $e_1'$ and $e_2'$ are respectively divided out by a dividing network consisting of resistors R3, R5 and R4, R6. A balancing network consisting of two equal resistances R7 and R8 is coupled in crosswise bridge configuration to the dividing network across the points P and Q. This provides an equilibrium condition at the crosspoint of the circuit bridges, whereby substantially no sinusoidal voltage occurs thereat.

The points P and Q may be further connected to each other by a breakdown diode such as a zener diode ZD to maintain the voltage across the control current terminals of the devices H1 and H2 at a constant value, so that the DC potentials at their Hall voltage electrodes are also maintained at an equal potential level. Furthermore, the breakdown diode ZD cancels undesirable mutually interfering Hall effects caused by the parallel interconnection of the two Hall effect devices, so that distortion of sinusoidal Hall voltages is prevented. This results in voltage $e_3$ which has a true sinusoidal waveform. The base electrodes of the power transistors T1 to T3 are thus driven by three-phase alternating voltages of equal amplitude.

In the three-phase brushless DC motor of the invention, only two Hall effect devices are required to effect communication of stator currents precisely out of phase by 120° from each other. Therefore, adjustment is only required of the two interacting Hall effect devices to compensate for any difference in the DC potential at their Hall voltage electrodes.

The foregoing description shows only a preferred embodiment of the present invention. Modifications may be made by those skilled in the art without departing from the scope of the invention which is only limited by the appended claims. Therefore, the embodiments shown and described are only illustrative, not restrictive.

What is claimed is:

1. A three-phase brushless DC motor having a permanent magnet rotor; three stator windings mutually displaced electrically by 120°; means for connecting in use said motor to a DC voltage source having a first and a second terminal; first and second Hall effect devices each connected to a corresponding one of the stator windings and mutually displaced electrically by 120° + (180° × n) where n is a whole number, said Hall effect devices having a pair of Hall voltage electrodes and a pair of control current electrodes, the stator windings having their one ends connected in common to the first terminal of the DC voltage source; first, second and third power transistors each having emitter, base and collector electrodes and a collector-emitter path, means for connecting the other end of each of the stator windings to the second terminal of the DC voltage source via the collector-emitter path of a corresponding one of the power transistors, connections connecting the base electrode of the first and second power transistors to one of the Hall voltage electrodes of a corresponding one of said first and second Hall effect devices, and means for connecting the base electrode of the third power transistor to the other Hall voltage electrodes of said first and second Hall effect devices; and current regulating means; means for connecting in use one of the control current electrodes of said Hall effect devices to the first terminal of said DC voltage source via the current regulating means, and means for connecting in use the other control current electrode of said Hall effect devices to the second terminal of said DC voltage source.

2. A three-phase brushless DC motor as set forth in claim 1, including means for connecting the base electrode of said third power transistor to said other Hall voltage electrode of said Hall effect devices respectively and comprising a first and a second resistor of equal resistance value.

3. A three-phase brushless DC motor as set forth in claim 1, including means for connecting the base electrodes of said first and second power transistors via a third and a fourth resistor of equal resistance value to said one of the Hall voltage electrodes, a fifth and sixth resistors of equal resistance in a series connection, means connecting the base electrodes of said first and second power transistors to respective ends of said series connection of said fifth and sixth resistors.

4. A three-phase brushless DC motor as set forth in claim 3, wherein the control current electrodes of said Hall effect devices are connected in common via series-connected seventh and eighth resistors of equal resistance value, a junction point of said seventh and eighth resistors being connected to a junction point of said fifth and sixth resistors.

5. The three-phase DC brushless motor as set forth in claim 4, wherein the resistance value of each of said seventh and eighth resistors is smaller than the resistance value of each of said first to sixth resistors.

6. A three phase DC brushless motor as set forth in claim 1, including means for connecting the control current electrodes of said Hall effect devices in common to each other via a breakdown diode to maintain the voltage thereacross at a constant value, and the last-mentioned means including said breakdown diode.

7. A three-phase DC brushless motor as set forth in claim 1, including means for connecting in use the emitter electrodes of said first, second and third transistors in common to the second terminal of said DC voltage source via a resistive element, and the last-mentioned means including said resistive element.

8. A three-phase brushless DC motor having a permanent magnet rotor; three stator windings mutually displaced electrically by 120°; means for connecting in use said motor to a DC voltage source having a first and a second terminal; first and second Hall effect devices each being associated with a corresponding one of the stator windings and mutually displaced electrically by 120° + (180° × n) where n is a whole number, said Hall effect devices having a pair of Hall voltage electrodes and a pair of control current electrodes, means for connecting in use the stator windings having their one ends connected in common to the first terminal of the DC voltage source; first, second and third power transistors having emitter, base and collector electrodes and a collector-emitter path, means for connecting in use the other end of each of the stator windings to the second terminal of the DC voltage source via the collector-emitter path of a corresponding one of the power transistors; a voltage dividing and balancing network; a voltage combining network; the base electrode of the first and second power transistors being connected to one of the Hall voltage electrodes of a corresponding one of said first and second Hall effect devices via the dividing and balancing network, and the base electrode of the third power transistor being connected to the other Hall voltage electrodes of said first and second Hall effect devices via the voltage combining network; and current regulating means; means for connecting in use of the control current electrodes of said Hall effect devices to the first terminal of said DC voltage source via the current regulating means, means for connecting the other control current electrodes of said Hall effect devices in use to the second terminal of said DC voltage source, and the control current electrodes of said Hall effect devices being connected to each other via the dividing and balancing network.

9. A three-phase brushless DC motor as set forth in claim 8, wherein said voltage combining network comprises series connected resistors of equal resistance, and wherein the base electrode of said third transistor is connected to a point between the last-mentioned resistors.

10. A three-phase brushless DC motor as set forth in claim 8, wherein said voltage dividing and balancing network comprises a first bridge circuit connected between the base electrodes of said first and second transistors and a second bridge circuit connected between the control current electrodes of said Hall effect devices, the first bridge circuit including two pairs of resistors of equal resistance, the second bridge circuit including two resistors of equal resistance, the intermediate point between the resistors of the second bridge circuit being connected to the intermediate point between the pairs of resistors of said bridge circuit.

* * * * *